(12) United States Patent
Osmundson

(10) Patent No.: US 10,744,464 B2
(45) Date of Patent: Aug. 18, 2020

(54) CERAMIC MEMBRANE MODULE WITH DRIVE PLATE AND RELATED METHODS

(71) Applicant: Nanostone Water Inc., Waltham, MA (US)

(72) Inventor: Paul Osmundson, Eden Prairie, MN (US)

(73) Assignee: Nanostone Water Inc., Waltham, MA (US)

( * ) Notice: Subject to any disclaimer, the term of this patent is extended or adjusted under 35 U.S.C. 154(b) by 130 days.

(21) Appl. No.: 16/165,870

(22) Filed: Oct. 19, 2018

(65) Prior Publication Data
US 2019/0054424 A1 Feb. 21, 2019

Related U.S. Application Data

(63) Continuation of application No. PCT/US2017/028947, filed on Apr. 21, 2017.

(60) Provisional application No. 62/326,430, filed on Apr. 22, 2016.

(51) Int. Cl.
*B01D 65/00* (2006.01)
*B01D 63/02* (2006.01)
*B01D 71/02* (2006.01)

(52) U.S. Cl.
CPC ........... *B01D 65/003* (2013.01); *B01D 63/02* (2013.01); *B01D 63/022* (2013.01); *B01D 71/02* (2013.01); *B01D 71/024* (2013.01); *B01D 2313/025* (2013.01); *B01D 2313/04* (2013.01); *B01D 2313/14* (2013.01)

(58) Field of Classification Search
CPC .... B01D 65/003; B01D 63/02; B01D 63/022; B01D 71/02; B01D 71/024; B01D 2313/14; B01D 2313/025; B01D 2313/04
See application file for complete search history.

(56) References Cited

U.S. PATENT DOCUMENTS

| | | |
|---|---|---|
| 4,101,423 A | 7/1978 | Merrill et al. |
| 4,428,758 A | 1/1984 | Montierth |
| 4,902,319 A | 2/1990 | Kato et al. |
| 5,174,900 A | 12/1992 | Nichols et al. |
| 6,454,274 B2 | 9/2002 | White et al. |

(Continued)

FOREIGN PATENT DOCUMENTS

| | | |
|---|---|---|
| FR | 2854820 | 5/2004 |
| WO | WO2017/185033 | 10/2017 |

OTHER PUBLICATIONS

International Search Report and Written Opinion issued in PCT/US2017/028947 dated Jun. 29, 2017, pp. 1-12.

*Primary Examiner* — Liam Royce
(74) *Attorney, Agent, or Firm* — Fish & Richardson P.C.

(57) ABSTRACT

A method for forming a ceramic membrane module system includes disposing at least one membrane within a housing, disposing at least one sealing pad adjacent to the membrane, and disposing at least one drive plate assembly adjacent to the at least one sealing pad. The method further includes coupling the at least one drive plate assembly with the housing, applying force to the sealing pad with the drive plate assembly, sealing the capillaries of a membrane end with the at least one sealing pad and forming a seal between the at least one sealing pad and the membrane, and disposing potting material into the housing without plugging more than 15% of the capillaries with the potting material.

14 Claims, 6 Drawing Sheets

(56) References Cited

U.S. PATENT DOCUMENTS

| | | |
|---|---|---|
| 9,061,251 B2 | 6/2015 | Hobbs et al. |
| 2006/0151373 A1* | 7/2006 | Szabo .................. B01D 63/023 210/321.61 |
| 2008/0152893 A1* | 6/2008 | Stroh ................... B01D 71/024 428/313.9 |
| 2009/0277826 A1 | 11/2009 | Pedersen et al. |
| 2013/0153485 A1 | 6/2013 | Goebbert et al. |

* cited by examiner

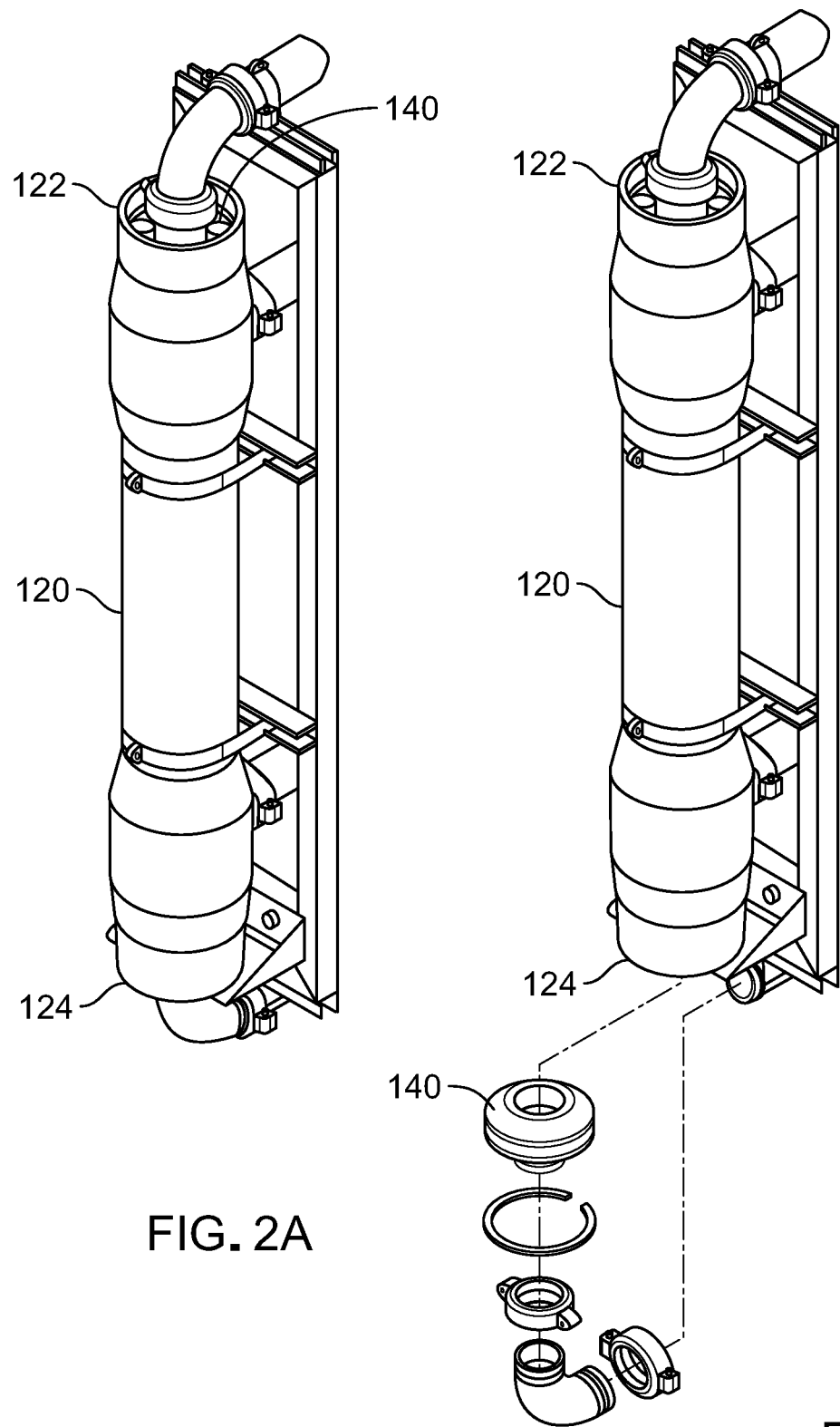

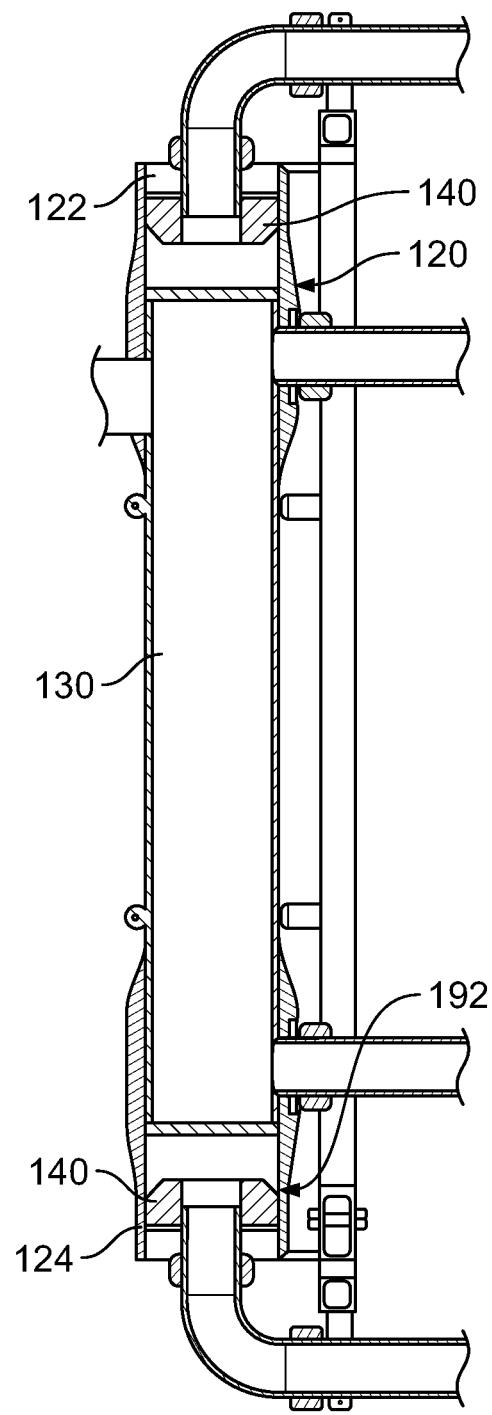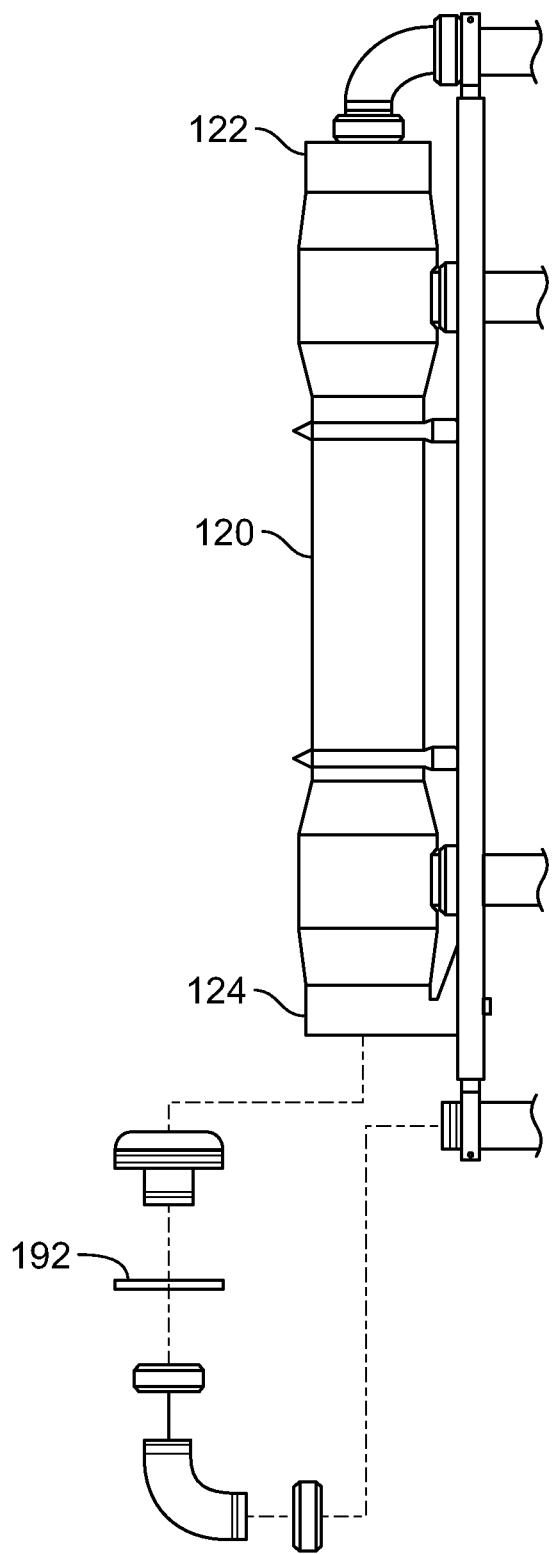
FIG. 3A
FIG. 3B

CERAMIC MEMBRANE MODULE WITH DRIVE PLATE AND RELATED METHODS

CROSS-REFERENCE TO RELATED APPLICATIONS

This application is a by-pass continuation and claims priority to International Application Number PCT/US2017/028947 filed on Apr. 21, 2017 which claims priority to U.S. Provisional Application No. 62/326,430 that was filed on Apr. 22, 2016. The entire contents of the applications referenced above are hereby incorporated by reference herein.

TECHNICAL FIELD

This invention relates to a ceramic membrane module with a drive plate assembly and related methods.

BACKGROUND

Many waters contain contaminants that can present a hazard to people or the environment, or make further processing, such as evaporation or reverse osmosis more difficult. Membrane filters are commonly used to remove such contaminants. Membrane elements are typically made of polymers or ceramics, both of which are frequently placed inside a pressure vessel to contain the pressurized fluid to be treated. The element and pressure vessel combination are referred to as membrane modules or modules. Such pressure vessels also provide separate ports to allow a feed to enter the module, filtrate to exit after being processed through the membrane, and a retentate chamber for removal of the filtered material.

Ceramic membranes that are commonly used have a multilayer structure with a relatively high permeability support, and a thinner separation layer which enables the separation by passing some components (typically water and small solutes) while retaining others. To increase surface area, a number of channels or capillaries are typically present in the support, each with a coating. During use of the membrane, feed enters these capillaries before passing through the membrane into the support structure. To keep feed from passing directly into the support on either end, a face end seal layer is used to prevent transport through the ends. Commonly used materials for face end seals include epoxies, polyurethanes, and glass. In comparison to the other components in a ceramic membrane module, this face end seal is particularly sensitive to mechanical damage due to both the material properties of the face end seal, and the fact that housings which have been used to date leave the face end seal at the end of the housing, preventing it from serving as shielding.

SUMMARY

A module design advantageously allows the housing to protect, shield, and/or create an impingement zone or buffer space around the face end seal improving the durability and integrity of the membrane.

Ceramic membrane modules are typically heavy and require mechanical support. Conventional ceramic housings require the ceramic in the housing to be supported so that the external end caps which are affixed to the bottom of the housing can be installed before use, or removed while in a system to access the ceramic (e.g., to determine whether damage to the face end seal has occurred). This requires a method to support the weight of the ceramic above the ground, which makes routine inspections difficult to perform. This can be accomplished by recessing the element inside the housing. However to do so there is a need for a process to provide potting material to seal the element to the housing, while preventing the potting material from flowing over the end of the module and blocking capillaries. What is needed is a process to position the module within the housing and seal the capillary area on the end of the element so that potting material can be applied to mount the element within the housing without blocking capillaries.

In some embodiments, a method for forming a ceramic membrane module system comprises disposing at least one membrane within a housing, where the housing has a first housing end and a second housing end, the membrane has capillaries therein, and the capillaries extend from at least a first end of the membrane. The method further includes disposing at least one sealing pad adjacent to the membrane, disposing at least one drive plate assembly adjacent to the at least one sealing pad, coupling the at least one drive plate assembly with the housing, applying force to the sealing pad with the drive plate assembly, sealing the capillaries of first membrane end with the at least one sealing pad and forming a seal between the at least one sealing pad and the membrane, and disposing potting material into the housing without plugging more than 15% of the capillaries with the potting material.

In some embodiments, disposing at least one spacer pad adjacent to the at least one sealing pad, between the drive plate assembly and the at least one sealing pad.

Implementations may include one or more of the following features: disposing the at least one sealing pad and at least one spacer pad includes disposing at least one sealing pad and at least one spacer pad at each end of the housing. Measuring displacement of the at least one sealing pad while force is being applied to the at least one sealing pad. Removing the sealing pads and spacer pads from the housing. Pre-potting the membrane. Disposing potting material includes disposing potting material through a side port of the housing (e.g., a potting side port), and closing the side port after the potting. Disposing potting material includes disposing potting material through the at least one sealing pad.

In some embodiments, a filtration assembly formation assembly includes a housing, a membrane extending from a first membrane end to a second membrane end, where the membrane is disposed within the housing, and the membrane has capillaries therein, where the capillaries have capillary ends. The assembly further includes at least one sealing pad disposed adjacent to the membrane, and the drive plate assembly configured to apply force to the sealing pad to seal off the capillary ends.

Implementations may include one or more of the following features: at least one spacer pad disposed adjacent to the at least one sealing pad, where the spacer pad is disposed between the drive plate assembly and the at least one sealing pad. At least one spacer pad is disposed at each end of the membrane, and at least one sealing pad is disposed at each end of the membrane. The membrane is a pre-potted membrane. A measurement device configured to measure displacement of the at least one sealing pad while force is being applied to the at least one sealing pad. The housing includes a potting side port.

These and other embodiments, aspects, advantages, and features of the present invention will be set forth in part in the description which follows, and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A is a perspective view of a ceramic membrane system.

FIG. 2B is a partially exploded perspective view of a ceramic membrane system.

FIG. 3A is a perspective view of a ceramic membrane system.

FIG. 3B is a partially exploded perspective view of a ceramic membrane system.

Like reference symbols in the various drawings indicate like elements.

DETAILED DESCRIPTION

Figure 1B:
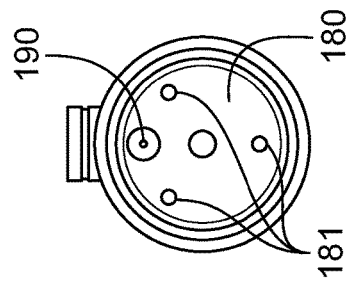
FIG. 1B illustrates an end view of a filtration system.

A ceramic membrane module system 100 is shown in FIGS. 1A, 1B, 1C 2A, 2B, 3A, 3B, 4, and 5. In some embodiments, the system 100 includes a drive plate assembly 160 that includes a drive plate 180, a retaining plate 188, and plate displacement device 181, including but not limited to, screws, bolts, cams, or similar for moving the drive plate 180. The drive plate assembly 160 is used near the end portions of a membrane 130 (e.g., a ceramic membrane) in conjunction with a retention member 184. The retention member 184 couples the drive plate assembly 160 with the housing 120, and holds the drive plate assembly 160 in place when the drive plate assembly 160 is used to apply pressure to a sealing pad 142. In some embodiments, the retention member 184 includes a thrust retainer, swing bolt/Victaulic type couplings, retaining bolts or pins, V-bands, or union closures. A sealing pad 142 and spacer pad 150 is disposed between the drive plate assembly 160 and the membrane 130.

In some embodiments, the drive plate 180 has an outer shape that is similar to an inner shape of the housing 120, for example, a circular shape. The drive plate 180 has an outer dimension that is smaller than the inner dimensions of the housing 120. In some embodiments, there is a gap of about ½ mm-5 mm between the outer perimeter of the drive plate 180 and the inner dimension of the housing 120.

In some embodiments, the plate displacement device 181 includes a number of screws. In some embodiments, there are 1-6 screws. In one more embodiments, there are three screws. The screws apply a compressive force to the drive plate 180. In some embodiments, 5 psi-100 psi of force is applied.

The retaining plate 188 is mechanically coupled with the housing 120, and a retention member 184, also mechanically coupled with the housing 120, prevents movement of the retaining plate 188 along the longitudinal axis of the housing 120 during use of the drive plate assembly 160.

The drive plate assembly 160 is further used in conjunction with the sealing pad 142 and spacer pad 150. The sealing pad 142 is disposed directly against the membrane, and the spacer pad 150 is disposed between the sealing pad 142 and the drive plate 180. The drive plate 180 is disposed between the retaining plate 188 and the spacer pad 150.

The drive plate assembly 160 has an uncompressed state (FIG. 1A) and a compressed state. In the compressed state, the drive plate 180 displaces the sealing pad 142 by 3-25%. In some embodiments, the sealing pad 142 is elastic, and can be formed of elastomeric material, such as a natural or silicone rubber. In some embodiments, the sealing pad 142 is formed of rubber that is about 30-90 durometer, Shore A hardness.

The drive plate 180 can be made of rigid material, such as durable thermoplastic, composite material, stainless steel, or aluminum. In some embodiments, the thickness of the drive plate 180 is about 10 mm-30 mm. In some embodiments, the thickness of the drive plate is 5-20% of the inner dimension of the housing 120, such as the inner diameter. This arrangement prevents flexing of the drive plate 180, since flexing puts uneven pressure on the sealing pad 142.

During use of the drive plate assembly 160, the plate displacement device 181 of the drive plate assembly 160 is moved. For instance, screws are turned to compress the drive plate 180 against the spacer pad 150 and the sealing pad 142. As the drive plate 180 applies force to the spacer pad 150, the spacer pad 150 forces the sealing pad 142 against the membrane 130 and substantially seals the end of the membrane 130. In some embodiments, a measurement device 190 (shown in FIG. 1B), such as a sensor, is included with the drive plate assembly 160 to measure the amount of displacement as force is applied with the drive plate assembly 160. In some embodiments, a measurement device 190 such as a dial indicator is coupled with the drive plate assembly 160 to measure the amount of displacement of the sealing pad 142. The measurement device 190 is configured to measure displacement of the at least one sealing pad 142 while force is being applied to the at least one sealing pad 142.

The distance of the ceramic membrane 130 and potting from the end of the module housing 120 provides for protection of the face end seal from accidental mechanical damage, while the distance from the end cap 140 provides for mixing and uniform distribution of fluids to be processed. Since the housing 120 withstands the pressure, a variety of end cap designs can be used interchangeably and be made of various materials to optimize performance in a given installation. For instance, in applications where a high salinity stream is used, a plastic end cap may be used to minimize corrosion, while in a high temperature application a metal end cap may be replaced. Recessing the ceramic membrane 130 decreases the range of approaches which could cause damage, and thus the risk of damage to the membrane 130.

The membrane module system 100 is commonly used in a vertical orientation, and can be supported by the edges of the base of the housing 120, while leaving the center region with clearance to remove the end cap 140 and access the membrane. The membrane module system 100 could also be supported around its circumference.

The material used for the end cap 140 can be chosen from a variety of materials. Thermoset or thermoplastics may be used, and the may be used with or without reinforcement materials. These may include acrylonitrile butadiene styrene (ABS), acetal, polyphenylene ether (PPE) resin, Nylon, polyether ether ketone (PEEK), polyethylene terephthalate (PET), Polyphenylsulfone (PPSU), polyetherimide (PEI), chlorinated polyvinyl chloride (CPVC), polyvinyl chloride (PVC), polypropylene (PP), polyethylene (PE), polyvinylidene fluoride (PVDF), polytetrafluoroethylene (PTFE), epoxies, urethanes, or other plastics. These end caps 140 may also be reinforced by the use of an external plate, for example made of metal such as steel or aluminum. The end cap 140 may also be made of metals that are optionally coated or modified to improve stability to the fluids and cleaning agents used.

A variety of methods have been devised to affix the end cap 140 to the membrane module system 100. For instance thrust snap rings can be used to hold the end cap 140 in place internal to the vessel. Alternately, swing bolt/Victaulic type couplings, retaining bolts or pins, V-bands, union closures, or other similar closure styles can be used.

Figure 1A:
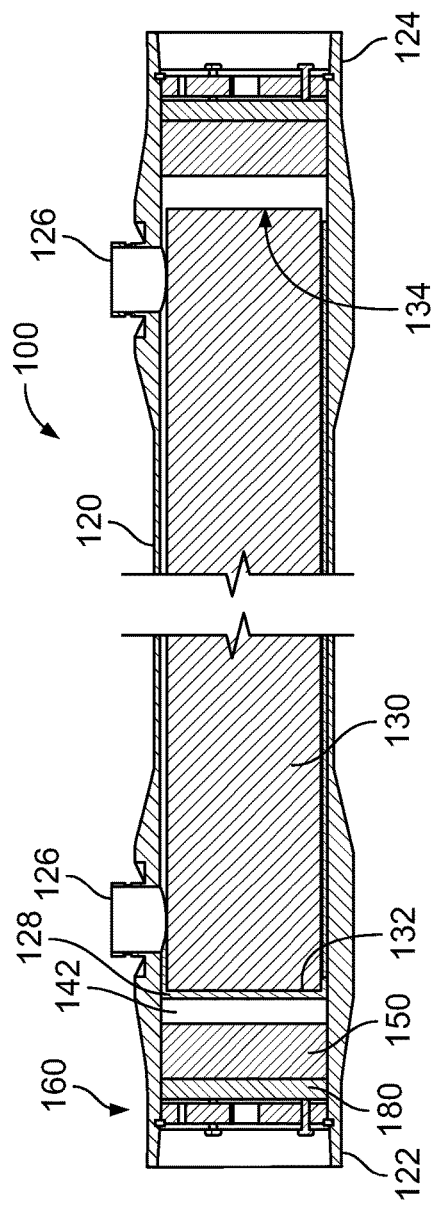
FIG. 1A illustrates a cross-sectional view of a filtration system.
Figure 1C:
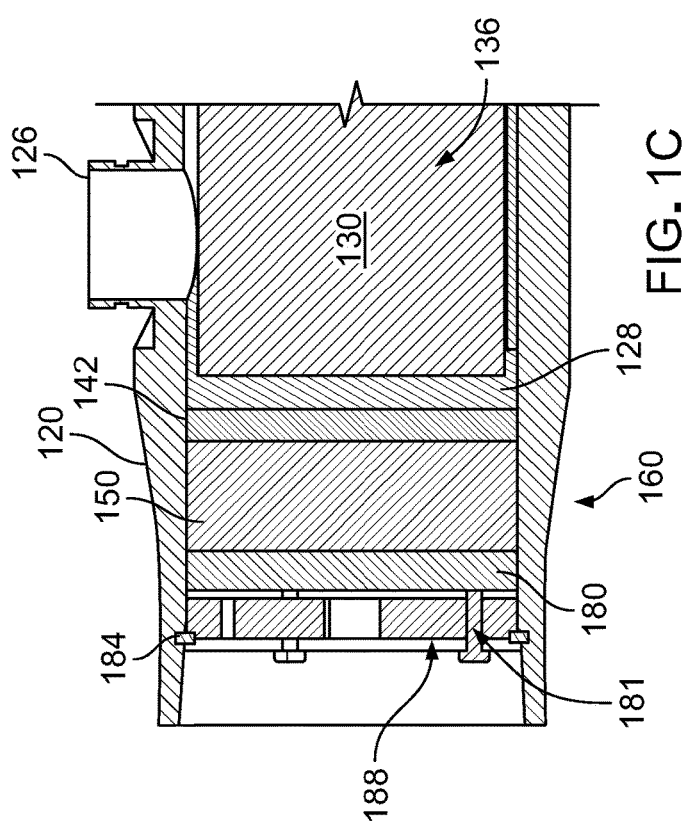
FIG. 1C illustrates an enlarged cross-sectional view of a portion of a filtration system.
Figure 4:
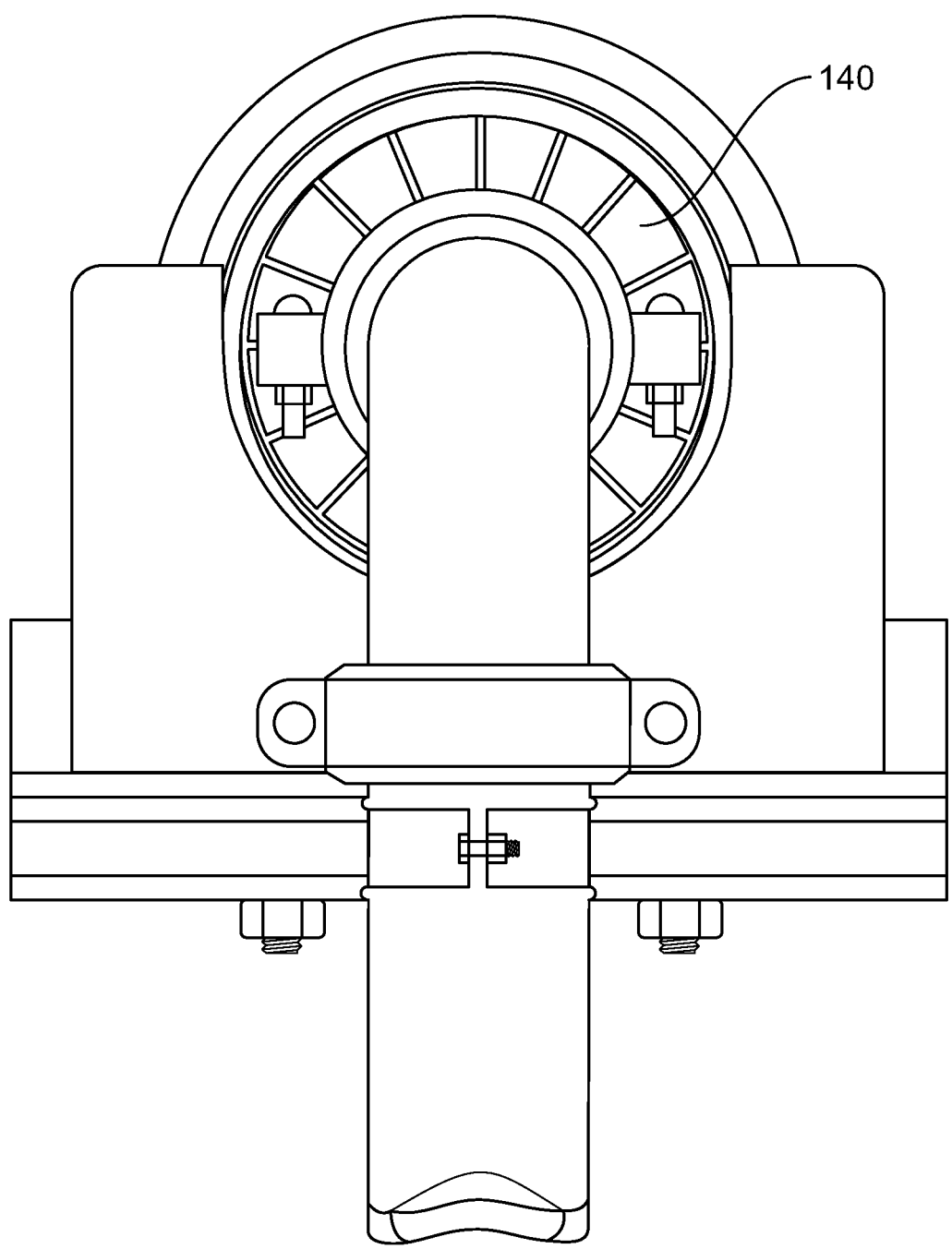
FIG. 4 illustrates a bottom view of a ceramic membrane system.
Figure 5:
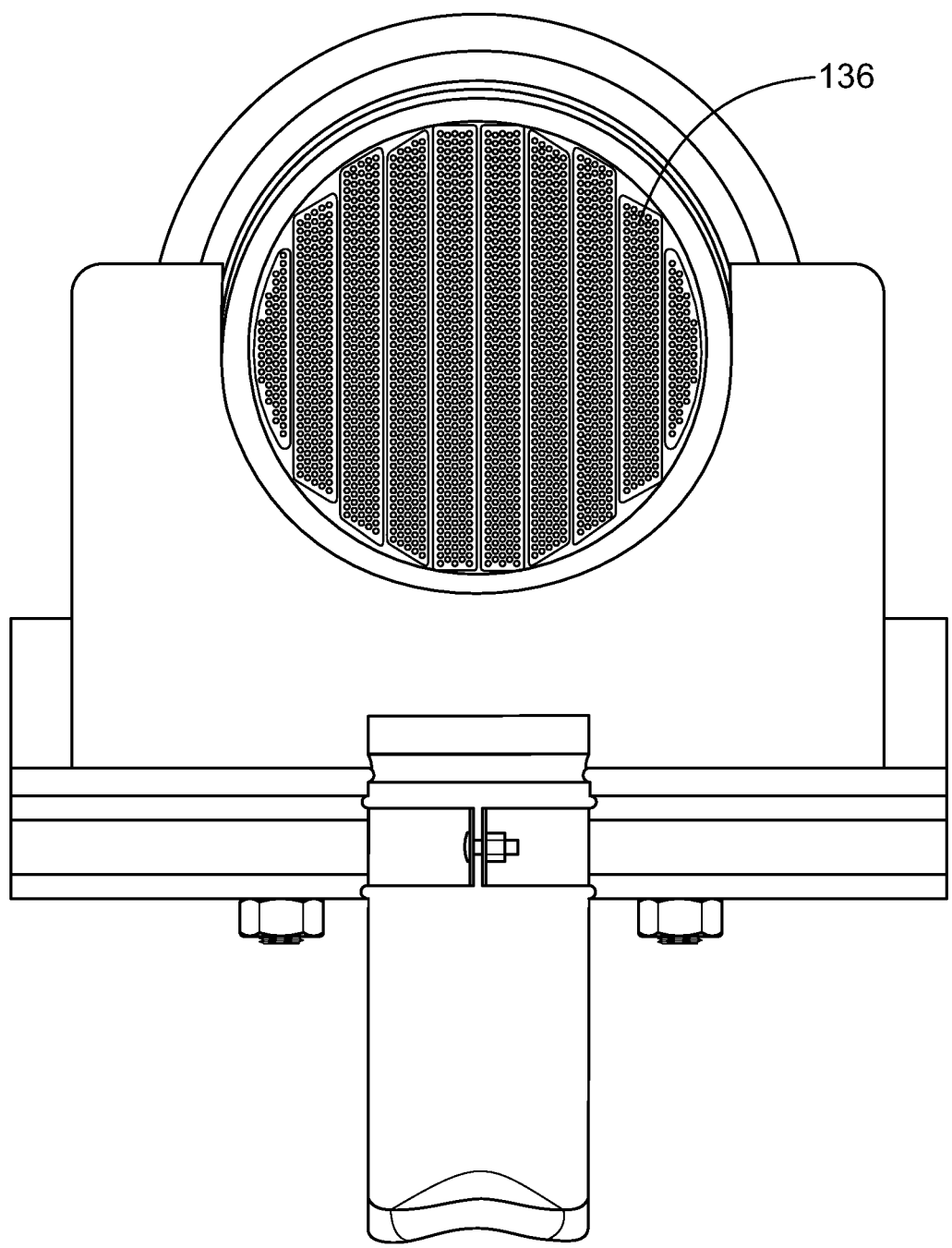
FIG. 5 illustrates an end view of a ceramic membrane system.
Figure 6:
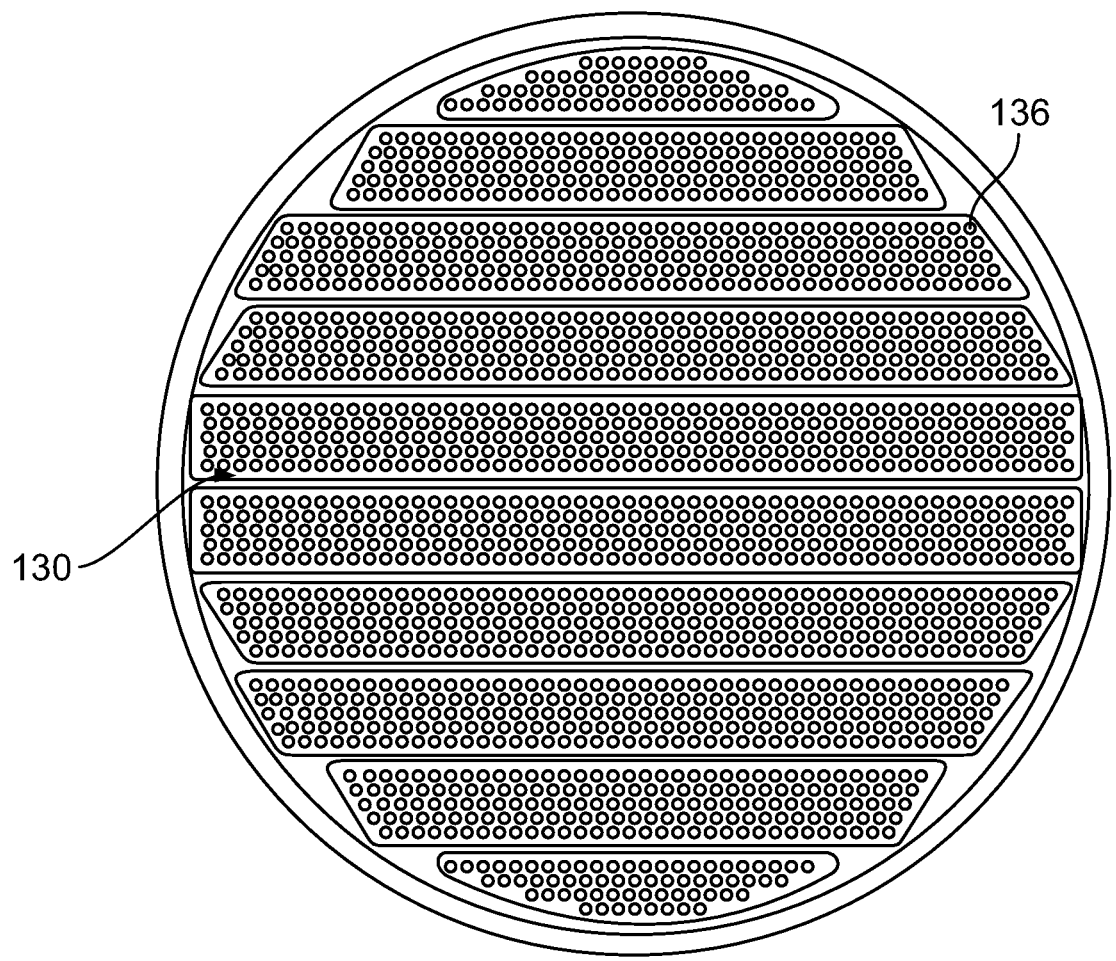
FIG. 6 illustrates an end view of ceramic membranes.

Some embodiments for forming a ceramic membrane module system 100, and referring to FIGS. 1A, 1B, and 1C, includes placing a membrane 130 within a housing 120, where the housing 120 has a first housing end 122 and a second housing end 124, and the membrane 130 has capillaries 136 (see FIG. 6) therein, where the capillaries 136 extend from at least a first end 132 of the membrane 130. In some embodiments, the capillaries 136 extend from the first end 132 to the second end 134 of the membrane 130. The membrane 130 is recessed from at least one of the first or second housing ends 122, 124.

Assembly includes placing a resistant spacer pad 150 and sealing pad 142 near the first end 132 of the membrane 130 and sealing the capillaries 136, and placing at least one end cap 140 in the housing near the spacer pad 150.

Additional steps include sealing the first housing end 122 with the sealing pad 142 and forming a seal. Force is applied to the sealing pad 142 with the drive plate assembly 160. The plate displacement device 181 (e.g., screws) of the drive plate assembly 160 is used to move the drive plate 180 along the longitudinal axis of the housing, where the screws are thrust from the retaining plate 188 to provide the force to the drive plate 180. The drive plate 180 provides force to the spacer pad 150, which in turn provides pressure to the sealing pad 142.

Additional steps include placing potting material 128 into the housing 120 without plugging the capillaries 136, for example without plugging more than 15% of the capillaries with the potting material 128. The sealing pad 142 keeps the potting in place during potting and curing, and then removed. Once the module is potted and cured, the sealing pad 142 is removed. In a further option, the method includes sealing and potting both ends of the housing using the above method. The drive plate assembly 160 can be used to perform the pre-potting. After the potting has occurred, the end cap 140 can be added.

A variety of materials can be used for the housing. In some embodiments, the materials include, but are not limited to, thermoplastics, fiber reinforced plastics (FRP) including ABS, acetal, PPE resin, Nylon, PEEK, PET, PPSU, PEI, CPVC, PVC, PP, PE, PVDF, PTFE, or combinations thereof. Thermoplastics may also include reinforcement materials such as carbon fiber, glass or ceramic particles or fibers to improve thermal and mechanical stability. Metals such as steel, stainless steel, aluminum, and titanium may also be used as a housing material. These metals may optionally be coated or modified to improve stability to the fluids and cleaning agents used during use. In some embodiments, the housing material includes fiber reinforced plastics, for instance glass fiber or carbon fibers reinforced with thermosets such as epoxy.

In some embodiments, the housing 120 includes side ports 126. These side ports 126 provide an exit connection for purified fluids, and access to clean the membrane surface by pressurizing the filtrate and causing the flow direction to temporarily reverse. The side port materials can be adjusted for the application; depending on temperature and chemical requirements, various metals alloys and sealing pad systems or other housing materials as indicated earlier may be used for these side ports 126.

Modules as described herein can be made by potting the ceramic membranes 130 within the housing 120. The ceramic membrane 130 is placed within the housing 120, for example, in a vertical orientation. A support is used with a sealing pad material that seals the capillaries while preventing the potting material 128 from sealing the capillaries of the ceramic membrane 130. The uncured potting material 128 is added through the side port 126, through the opposite end, or through a hole in the sealing pad 142 so that the potting material 128 completely seals the ceramic to the internal housing wall. The depth of this potting material 128 is chosen to maximize the mechanical integrity of the module, while minimizing the amount of potting material 128 used. Preferred amounts give a depth of potting material 128 between 0.1 and 20 cm, preferably between 0.5 and 5 cm, and more preferably between 1 and 3 cm. After the first side is potted, and sufficiently cured, the module can be inverted and the process repeated to pot the second end. In this instance the potting material 128 may be applied in a similar manner to the first side, through the side port 126 or sealing pad 142.

If a ceramic monolith is used, it can be potted directly into the housing 120. If a segmented monolith is to be used, it can be either placed into the vessel with a series of spacers or a fixturing device, either of which end up being encapsulated in potting material 128. Alternatively the segments may be first potted into a prepot. In a prepot concept both ends of the ceramic are first potted together at both ends with a disc of potting material 128. Gaskets can be used to prevent potting material 128 from entering the capillaries 136 and a mold is used to prepare the disc shape which is slightly smaller than the internal diameter of the housing 120.

To improve the adhesion of the potting material 128 to the vessel, the surface of the vessel may be modified prior to potting. This may include cleaning, for instance with solvent, acids, or bases, mechanical roughening of the surface, for instance by sanding, or chemical modification for instance by functionalization or plasma or corona treatment.

Recessed potting allows a mixing zone for uniform entry into the feed side of the membrane 130. The extension of the housing walls leads to a mechanical protection of the face end seal and ceramic membrane 130 from damage. The recessed potting allows a closure type that enables the use of a thrust snap ring closure type, a flat or domed inward or outward end cap, a swing bolt type enclosure, a v-band type closure, and other grooved type closure methods. These are cost advantages over other types of closure thus reducing the housing cost and the product cost. These methods can be used in FRP, metallic and other plastic type housings and or endcaps. In addition, the ceramic module described herein allows for less expensive and more chemically resistant endcaps and closure types such as inward domed or flat endcaps secured by thrust ring 192/grooved closures, V-band swing bolts, screwed union or other similar methods.

A number of embodiments of the invention have been described. Nevertheless, it will be understood that various modifications may be made without departing from the spirit and scope of the invention. Accordingly, other embodiments are within the scope of the following claims.

What is claimed is:

1. A method for forming a ceramic membrane module system, the method comprising:
    placing a membrane within a housing, the housing having a first housing end and a second housing end, the membrane having capillaries therein, the capillaries extending from at least a first end of the membrane;
    placing a sealing pad adjacent to the membrane;
    placing a drive plate assembly adjacent to the sealing pad;
    coupling the drive plate assembly to the housing;
    applying force to the sealing pad with the drive plate assembly;
    sealing the capillaries of the first membrane end with the sealing pad and forming a seal between the sealing pad and the membrane; and
    inserting potting material in the housing without plugging more than 15% of the capillaries with the potting material.

2. The method of claim 1, further comprising placing a spacer pad adjacent to the sealing pad, between the drive plate assembly and the sealing pad.

3. The method of claim 2, wherein placing the sealing pad and spacer pad includes placing the sealing pad and the spacer pad at each end of the housing.

4. The method of claim 1, further comprising measuring displacement of the sealing pad while force is being applied to the sealing pad.

5. The method of claim 3, further comprising removing the sealing pads and spacer pads from the housing.

6. The method of claim 1, further comprising pre-potting the membrane.

7. The method of claim 1, wherein inserting potting material includes inserting potting material through a side port of the housing, and closing the side port after the potting.

8. The method of claim 1, wherein inserting potting material includes inserting potting material through the sealing pad.

9. A method for providing a ceramic membrane module system comprising, within a housing, a membrane comprising capillaries therein which extend from a first end of the membrane, a sealing pad sealed to the capillaries at the first end of the membrane, and a drive plate coupled to the housing and adjacent to the sealing pad, the method comprising:
    inserting potting material in the housing without plugging more than 15% of the capillaries with the potting material to provide the ceramic membrane module.

10. The method of claim 9, further comprising applying a force to seal the sealing pad to seal the capillaries at the first end of the membrane.

11. The method of claim 10, wherein the applying the force comprises using the drive plate assembly to apply the force.

12. The method of claim 11, further comprising sealing the capillaries of the first membrane end with the sealing pad.

13. The method of claim 10, further comprising sealing the capillaries of the first membrane end with the sealing pad.

14. The method of claim 9, further comprising sealing the capillaries of the first membrane end with the sealing pad.

* * * * *